United States Patent
Liguori

[19]

[11] Patent Number: 5,951,713
[45] Date of Patent: Sep. 14, 1999

[54] METHOD AND APPARATUS FOR CREATING COLOR BLENDS OF AN OUTPUT IMAGE BASED ON SELECTION OF NON-COINCIDENT POINTS ON AN INPUT IMAGE

[75] Inventor: Vincenzo Liguori, North Ryde, Australia

[73] Assignees: Canon Information Systems Research Australia Pty Ltd., New South Wales, Austria; Canon Kabushiki Kaisha, Tokyo, Japan

[21] Appl. No.: 08/528,708

[22] Filed: Sep. 15, 1995

[30] Foreign Application Priority Data

Sep. 16, 1994 [AU] Australia ............................. PM8222

[51] Int. Cl.$^6$ ................................................ G06T 11/00
[52] U.S. Cl. ............................................... 3465/429
[58] Field of Search .................... 395/129–132, 395/133, 121, 125–128; 345/429–433, 421, 425–428

[56] References Cited

U.S. PATENT DOCUMENTS

| | | | |
|---|---|---|---|
| 4,958,272 | 9/1990 | Wake | 345/432 |
| 5,347,618 | 9/1994 | Akeley | 395/121 |
| 5,459,823 | 10/1995 | Silverbrook et al. | 395/131 |

FOREIGN PATENT DOCUMENTS

| | | |
|---|---|---|
| B8022691 | 1/1992 | Australia . |
| WO91/19242 | 12/1991 | WIPO . |

*Primary Examiner*—Almis R. Jankus
*Attorney, Agent, or Firm*—Fitzpatrick, Cella, Harper & Scinto

[57] ABSTRACT

A method of calculating a color blend for an output image. In a fundamental form, the method comprises the steps of specifying a plurality of non-coincident points $(x_1, y_1, z_1)$, $(x_2, y_2, z_2)$, $(x_3, y_3, z_3)$ on a surface (1) to be subject to color blending. Next, a surface equation (Intensity=Ax+By+C) is derived for each color component from a pixel value $(z_1, z_2, z_3)$ of each of the points. The method then determines each output color component from the corresponding surface equation and a position of the pixel in the output image.

15 Claims, 8 Drawing Sheets

METHOD AND APPARATUS FOR CREATING COLOR BLENDS OF AN OUTPUT IMAGE BASED ON SELECTION OF NON-COINCIDENT POINTS ON AN INPUT IMAGE

FIELD OF THE INVENTION

The present invention relates to the creation of color blends for computer graphics and in particular describes a simplified format and apparatus for the creation of blends.

BACKGROUND ART

Apparatus for the creation of smooth shaded continuous tone images exist in various forms. For example, U.S. Pat. No. 4,958,272 (Wake) entitled "Apparatus and Method for Generating Smooth Shaded Continuous Tone Images" discloses a system for defining the boundaries of curve shape data and subsequently deriving an intensity level from a surface map of the defined curve shape data.

U.S. Pat. No. 3,996,673 (Vorst et al.) entitled "Image Generating Means" also discloses a system for the creation of a "blend" or smooth shaded continuous tone image through the defining of a boundary perimeter and an interpolation process for deriving final intensity values.

While these methods are satisfactory, their implementation is of undue complexity both in storage format and execution. Additionally, the alteration of the nature of the blend is again somewhat difficult, with the recalculation of a perimeter being required.

It is an object of the present invention to provide an improved form of blend creation.

SUMMARY OF THE INVENTION

In accordance with one aspect of the invention there is provided a method of calculating a color blend for an output image comprising a series of pixels, said method comprising, for each color component of said output image:

deriving a surface equation from a set of desired intensity values at a first arbitrary, non-coincident set of points of the output image; and for each desired output point of said output image, utilizing said equation to derive an output intensity value.

In accordance with another aspect of the present invention there is provided a blend calculation system for calculating a color blend for an output image, said system comprising:

a plurality of blend calculators for calculating color component intensity values, the number of said blend calculators corresponding to the number of desired color components in said output image, each of said blend calculators comprising:

a coefficient input means for the input of equation coefficient values to an equation calculator; and an equation calculator, connected to said coefficient input means, for calculating a color component intensity value.

BRIEF DESCRIPTION OF THE DRAWINGS

The preferred embodiment of the present invention will now be described with reference to the accompanying drawings in which.

DETAILED DESCRIPTION

Figure 1:
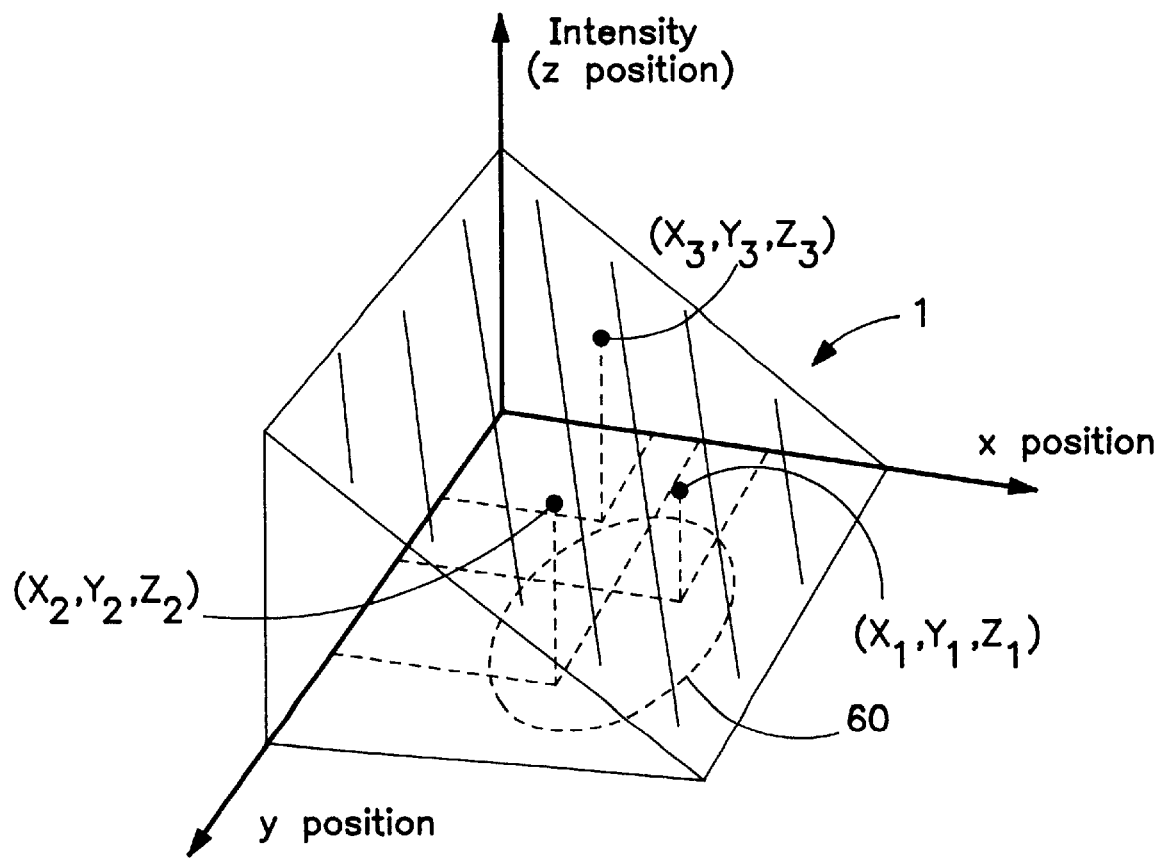
FIG. 1 illustrates a plane of a single color component utilized in the preferred embodiment.

In the preferred embodiment, the definition of a color blend proceeds by defining, for each color component of the system, a three dimensional plane having the axes coordinates in x position, y position and intensity. Referring now to FIG. 1 there is shown an example of a portion of a plane 1 defined in a coordinate system having x position, y position and intensity components. The general equation of the intensity component is as follows:

$$\text{Intensity} = Ax + By + C \qquad \text{Equation 1}$$

where x and y are the particular x and y positional coordinates and A, B and C are constants that define the nature of the plane.

The values A, B and C for a particular blend can be defined using a number of methods, including defining a series of intensity values at particular points in the plane 1 of FIG. 1. One method for defining the constants A, B and C is to define the intensity components of an image at three points $(x_1, y_1, z_1)$, $(x_2, y_2, z_2)$ and $(x_3, y_3, z_3)$ where z represents the intensity value. The values of A, B and C can then be obtained by substituting the three values for x, y and intensity z into Equation 1 to obtain a series of three linear equations which can be solved for A, B and C.

The above process can then be carried out for each color component of an image to derive a final color blend. For example, color images are commonly stored in a red, green and blue (RGB) format and in terms of a series of pixel locations. Therefore, for each pixel, red, green and blue intensity values must be output. Additionally, in compositing systems it is known to have a separate channel signifying the degree of transparency of a particular image. This allows an extension of the preferred embodiment to the "transparency plane" of a particular image whereby blends can be defined in the transparency plane in the same manner as blends are defined in the planes of the red, green and blue color components.

Figure 2:
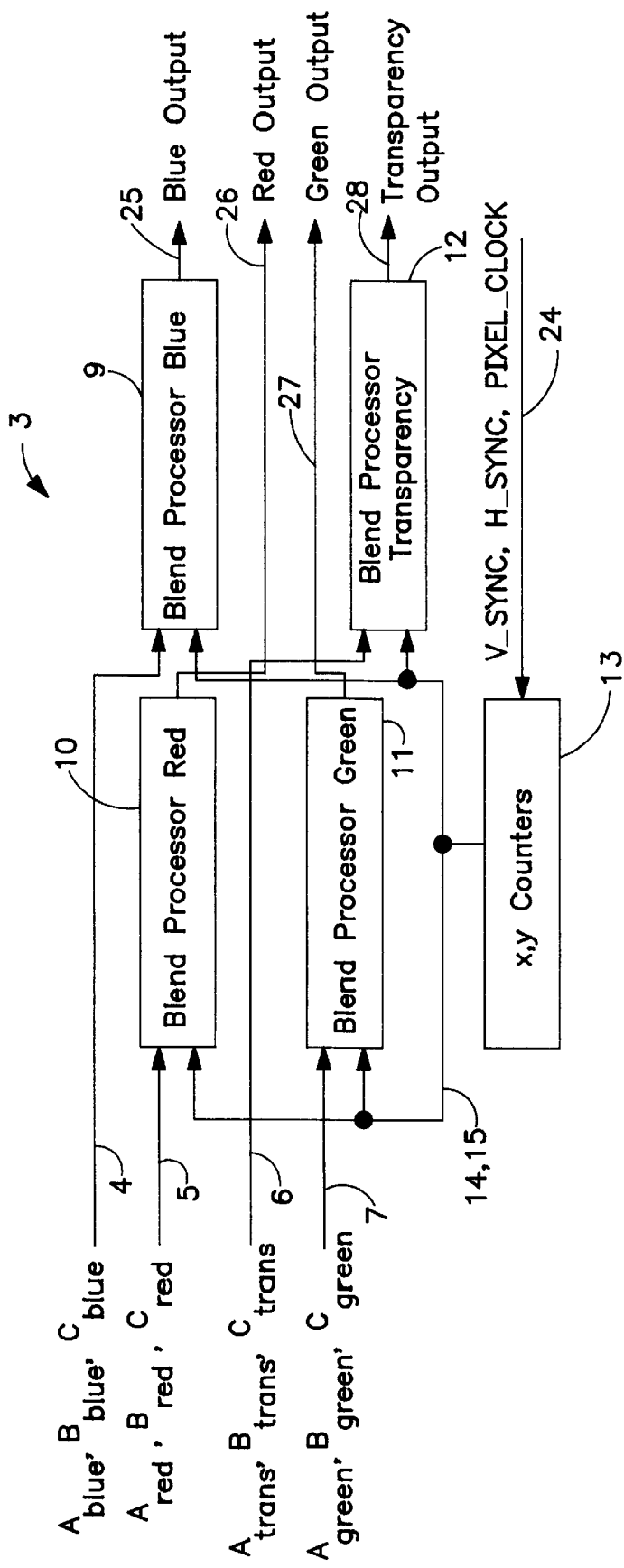
FIG. 2 illustrates a blend calculator in accordance with tie preferred embodiment.

Once the desired color and transparency coefficients have been derived, the corresponding blends can be produced utilizing the blend calculator 3 as shown in FIG. 2. The blend calculator 3 is utilized for calculating the blends of arbitrary computer objects. The blend calculator 3 receives four sets of inputs comprising blue plane coefficients 4 including coefficients, $A_{blue}$, $B_{blue}$ and $C_{blue}$, red plane coefficients 5, including coefficients $A_{red}$, $B_{red}$ and $C_{red}$, green plane coefficients 6, including coefficients $A_{green}$, $B_{green}$ and $C_{green}$, and transparency plane coefficients 7, including coefficients $A_{trans}$, $B_{trans}$ and $C_{trans}$. Each of these sets of plane coefficients 4–7 are forwarded to corresponding blend processors 9–12. Also forwarded to each of the blend processors 9–12 is an (x, y) position location derived from x–y counters 13. The x–y counters 13 derive the corresponding x and y values from pixel and line (including vertical and horizontal sync) clock signals 24 in a known manner.

Figure 3:
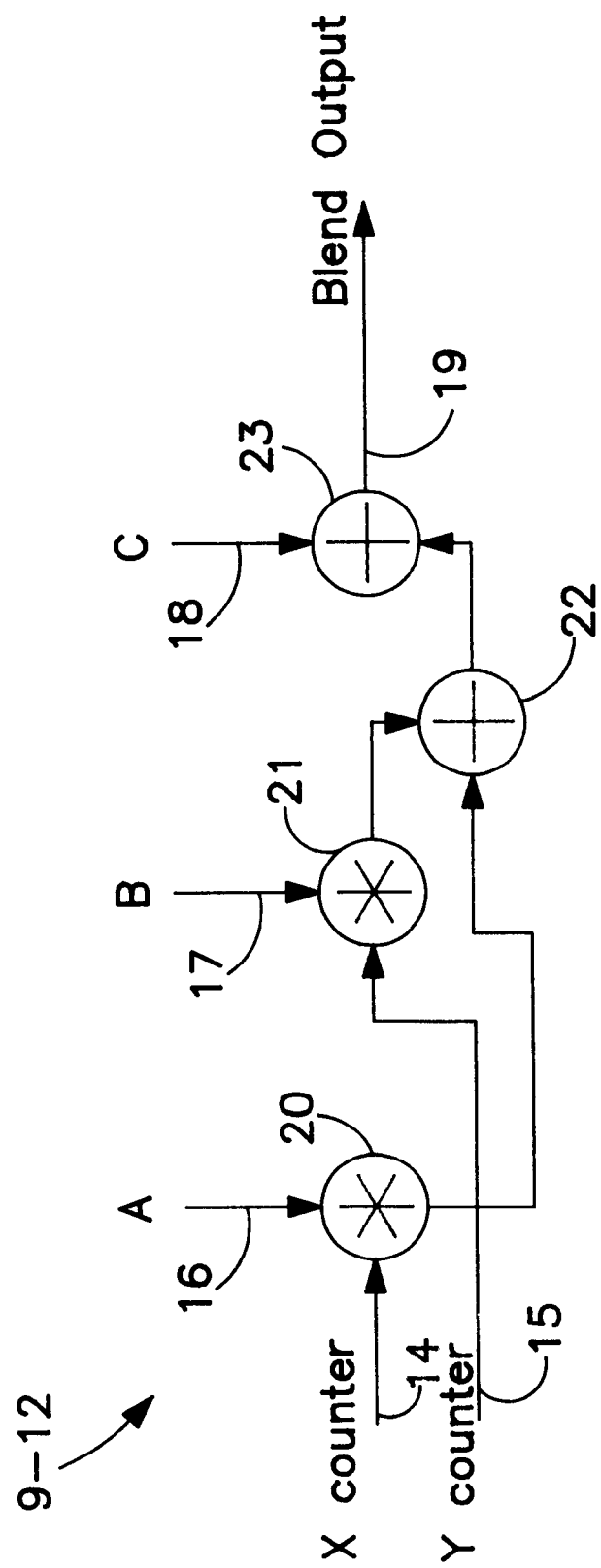
FIG. 3 illustrates one of the blend processors of FIG. 2 in more detail.

Referring now to FIG. 3, there is shown one of the four identical blend processors 9–12, Each blend processor 9–12 takes its coordinate input values 14, 15 in addition to its plane input coefficients 16, 17, 18 and calculates an intensity output 19 in accordance with equation 1. The x value 14 is multiplied by the A value 16 by means of a multiplier 20. The y value 15 is multiplied by the B value 17 in a multiplier 21. The outputs of the two multipliers 20 and 21 are added together in a summer 22 before being added to the input C value 18 by a summer 23 to thereby form the output 19.

Referring again to FIG. 2, the outputs of each of the color blend processors 9–12 can be output as separate color components 25–27 together with a transparency blend 28.

It can be seen from the above discussion that the preferred embodiment provides a compact form for the representation of blends and a simple method for their calculation which does not require the interpolation methods utilized in the prior art. Additionally, the storage of individual pixel values of a blend is not required as their values can be immediately calculated as required.

Figure 4:
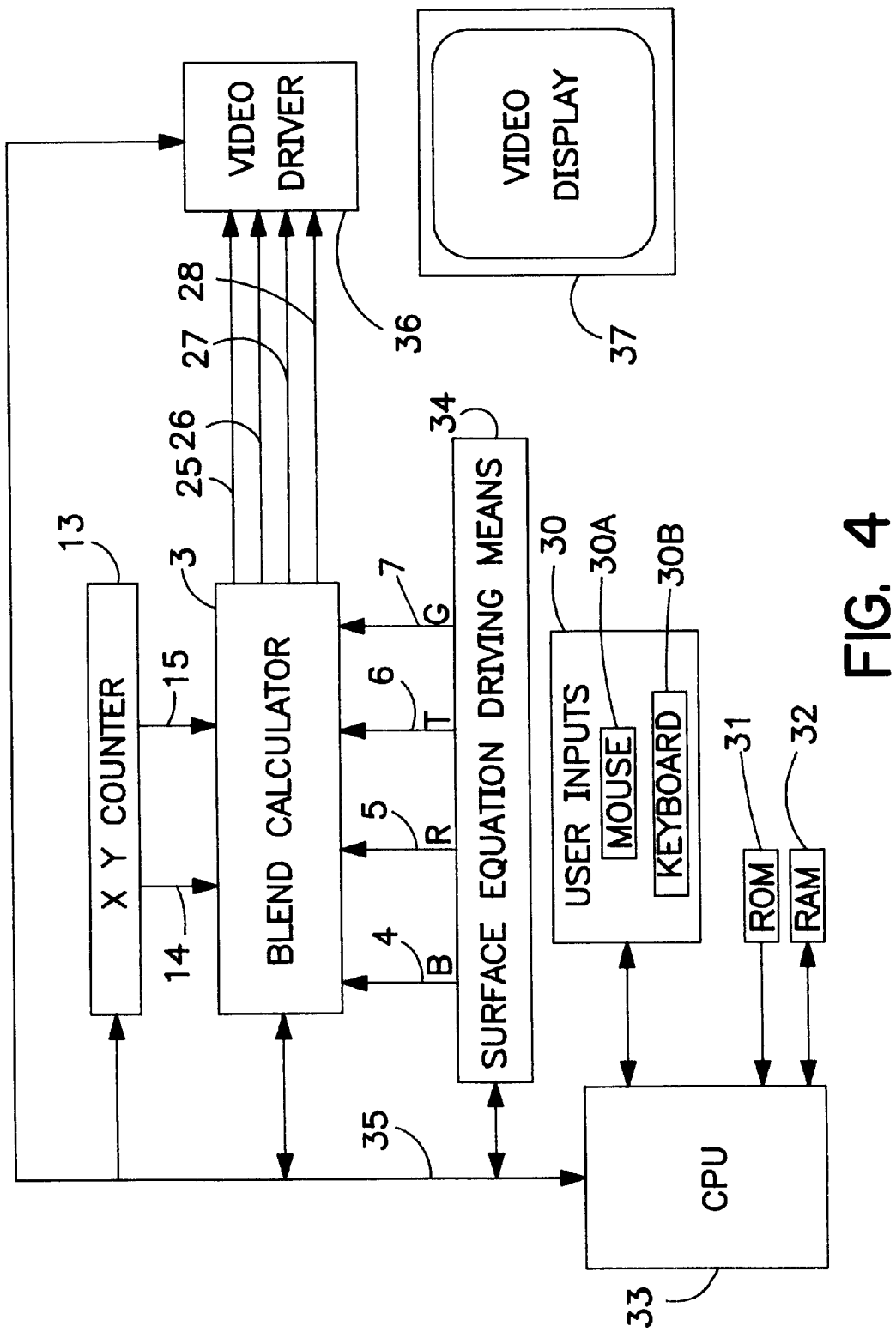
FIG. 4 schematically illustrates a graphics system incorporating the preferred embodiment.

FIG. 4 illustrates a typical computer graphics system incorporating a blend calculation arrangement in accordance with the preferred embodiment. A blend calculator 3 is connected to a system bus 35 controlled by a central processing unit (CPU) 33. Connected to the CPU 33 are a number of user inputs 30 typically comprising a mouse 30A and keyboard 30B. Also, a read-only memory (ROM) 31 is connected to the CPU 33 and includes controlling programs used for operation of the graphics system. A random access memory (RAM) 32 also connects to the CPU 33 and provides for temporary storage of variables generated during graphics processing.

Also connected to the bus 35 is a video driver 36 which supplies an output device, such as video display 37, for the reproduction of images generated by the graphics system. Those skilled in the art will appreciate that the graphics system of FIG. 4 can also connect to a printer or other type of reproduction device for permanent reproduction of graphic images. The connection of the video driver 36 to the bus 35 permits the CPU 33 to directly generate graphic images for display on the display 37.

Associated with the blend calculator 3 are the x–y counters 13 which also connect to the bus 35 to derive appropriate signals from the CPU 33 and the video driver 36.

A surface equation driving means 34 interconnects between the bus 35 and the blend calculator 3 to supply each of the constants A, B and C for each of the color components R, G, B, and T. The blend calculator 3 outputs to the video driver 36 which incorporates a switch to enable display of the color defined by the components 25, 26, 27 and 28 output from the blend calculator 3.

Figure 5:
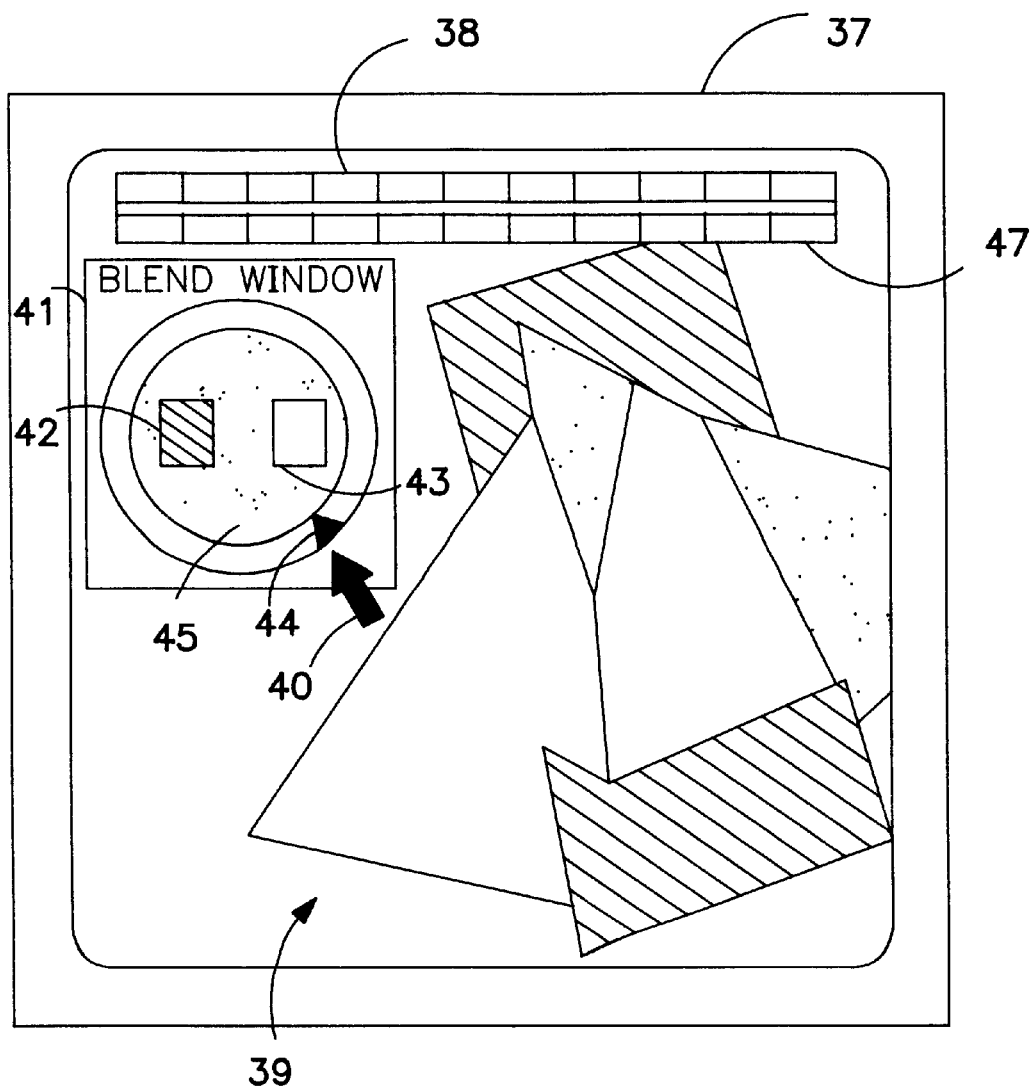
FIG. 5 depicts one blend color selection operation of the system of FIG. 4.

The operation of the graphics system of FIG. 4 can now be described with reference to FIG. 5 which illustrates an editing display screen reproducible on the video display 37. In this example, the video display 37 displays a continuous tone image 39 which is being edited by means of tools available from a tool bar 38 through the use of a mouse pointer 40 which is able to point to individual components and/or graphic objects that together form the image 39. A color bar 47 is also available, comprising a plurality of colors which may be selected through the use of the mouse pointer 40, When blending operations are desired, a blend window 41 is pulled down from the tool bar 38 to be displayed in a portion of the display 37. As illustrated, the blend window 41 includes two concentric circles, within the inner one of which are two boxes 42 and 43, Using the mouse pointer 40, specific colors can be selected from the image 39 or the color bar 47 and placed into the respective boxes 42 and 43 which then display the corresponding color. Thus, the boxes 42 and 43 respectively indicate the positions $(x_1, y_1, z_1)$ and $(x_2, y_2, z_2)$ as seen in FIG. 1.

Figure 6:
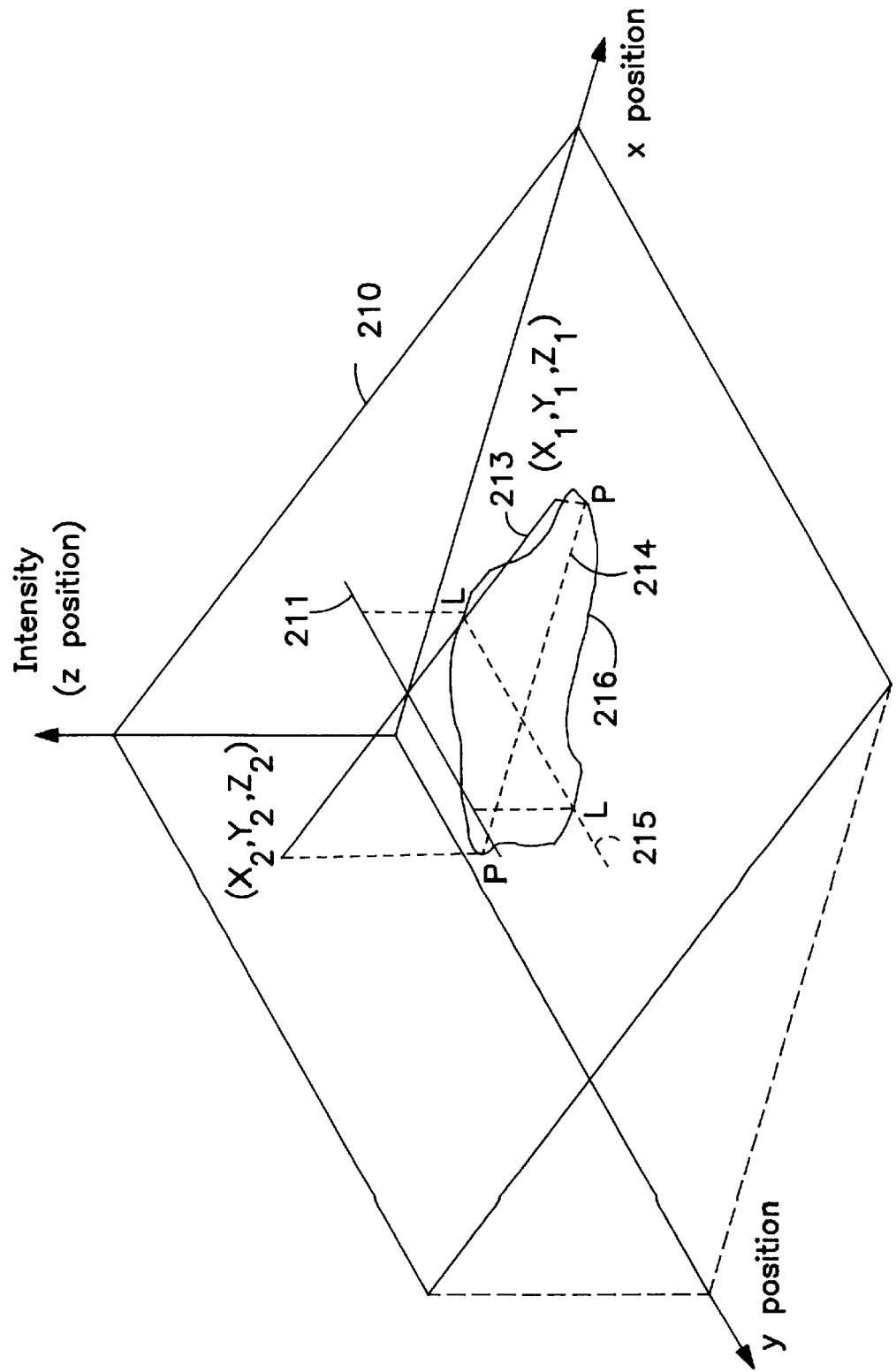
FIG. 6 geometrically depicts the blend color selection shown in FIG. 5.

In particular, the pre-selection of the two colors in the boxes 42 and 43 is not sufficient to enable a solution of a linear equation in three unknowns consistent with Equation 1. To solve for the coefficients, A, B and C of the linear equation, a relational constraint or a third selection point $(x_3, y_3, z_3)$, is required. Without loss of generality, a relational constraint enabling a solution of the coefficients A, B and C will be described with reference to FIG. 6. In this example a first line 213, passing through the position points $(x_1, y_1, z_1)$ and $(x_2, y_2, z_2)$, resides on a color blend plane 210. The projection of the first line 213 onto the x–y plane, and marked in FIG. 6 by the letters P—P, forms a projection line 214 which indicates a blend across a graphic object 216 from a specific color corresponding to the color selection at box 42 of FIG. 5 at the position $(x_1, y_1, z_1)$, to the color selected in box 43 of FIG. 5 at the position point $(x_2, y_2, z_2)$. The relational constraint is defined by requiring that the locus of points x,y lying on any line, in the x–y plane, perpendicular to the projection line 214, has a constant intensity for each of the color components R, G, B and T. This relational constraint is illustrated in FIG. 6 by an orthogonal projection line 215 which maps to a constant intensity line 211 (constant z value) on the blend plane 210 and defines the position of the blend plane 210 with respect to the xyz coordinate axis. A color blend on the graphic object 216, as defined by the blend plane 210, has a constant color and/or transparency along a line L—L (FIG. 6) where the orthogonal projection line 215 crosses the graphic object 216. Typically, any (x, y) position point lying on a line parallel to the orthogonal projection line 215 across the graphic object 216 has a different constant color and/or transparency.

In this embodiment, the preferred method for defining the blend plane 210, for each color component, is to have the orthogonal projection line 215 pass through either of the points $(x_1, y_1)$ or $(x_2, y_2)$ such that the line L—L across the graphic object 216 co-linear with the orthogonal projection line 215 takes on the specific color selection of the box 42 or box 43 respectively, Preferably, the relational constraint is achieved by requiring that the rate of change of the intensity, of the color components R,G,B and T is zero along the orthogonal projection line 215. The position points $(x_1, y_1, z_1)$ and $(x_2, y_2, z_2)$, together with the relational constraint is sufficient to enable the CPU 33 to commence calculation the constants A, B and C consistent with Equation 1 for each of the color components. The value of the constants A, B and C therefore define the color blend plane 210 for each color component R, G, B and T. Other relational constraints can alternatively be defined without departing from the scope of the present invention.

Residing within the annulus formed between the two concentric circles of the blend window 41 (FIG. 5) is a triangular indicator 44 which can be moved 360° around the annulus through manipulation of the window pointer 40. The triangle indicator 44 is indicative of the location of the projection line 214 defined by the two points of the color selection in the boxes 42 and 43. The location of the projection line 214 can be defined in any number of ways. In the illustrated example, as the triangular indicator 44 is moved around the annulus a predetermined amount of degrees, the blend plane 210 is rotated over the graphic object 216 about an axis of rotation parallel to the z-axis and positioned at the mid-point between $(x_1, y_1)$ and $(x_2, y_2)$, at an angle corresponding to the predetermined amount of degrees.

The triangular indicator 44 thus allows the color blend, specified by the color blend plane 210 for each of the color components (R, G, B and T) to rotate over the graphic object 216 about an axis of rotation chosen parallel to the z-axis through a predetermined point on the x–y plane. Preferably, the predetermined point on the x–y plane is coincident with the geometric center of the graphic object 216, however any point on the x–y plane can be chosen as a center of rotation. The CPU 33, with the aid of programs stored in the ROM 31 and RAM 32 calculates a rotation of the color blend plane 210 and a corresponding set of coefficients A, B, and C, which are passed to the surface equation driving means 24. The continuous blend of colors is calculated and displayed in real-time within the circle 45. Once the desired color is obtained, the window pointer 40 can the be clicked upon the circle 45 inside the concentric circles and then clicked upon a selected portion of the image 39 to effect a color change thereof.

Figure 7:
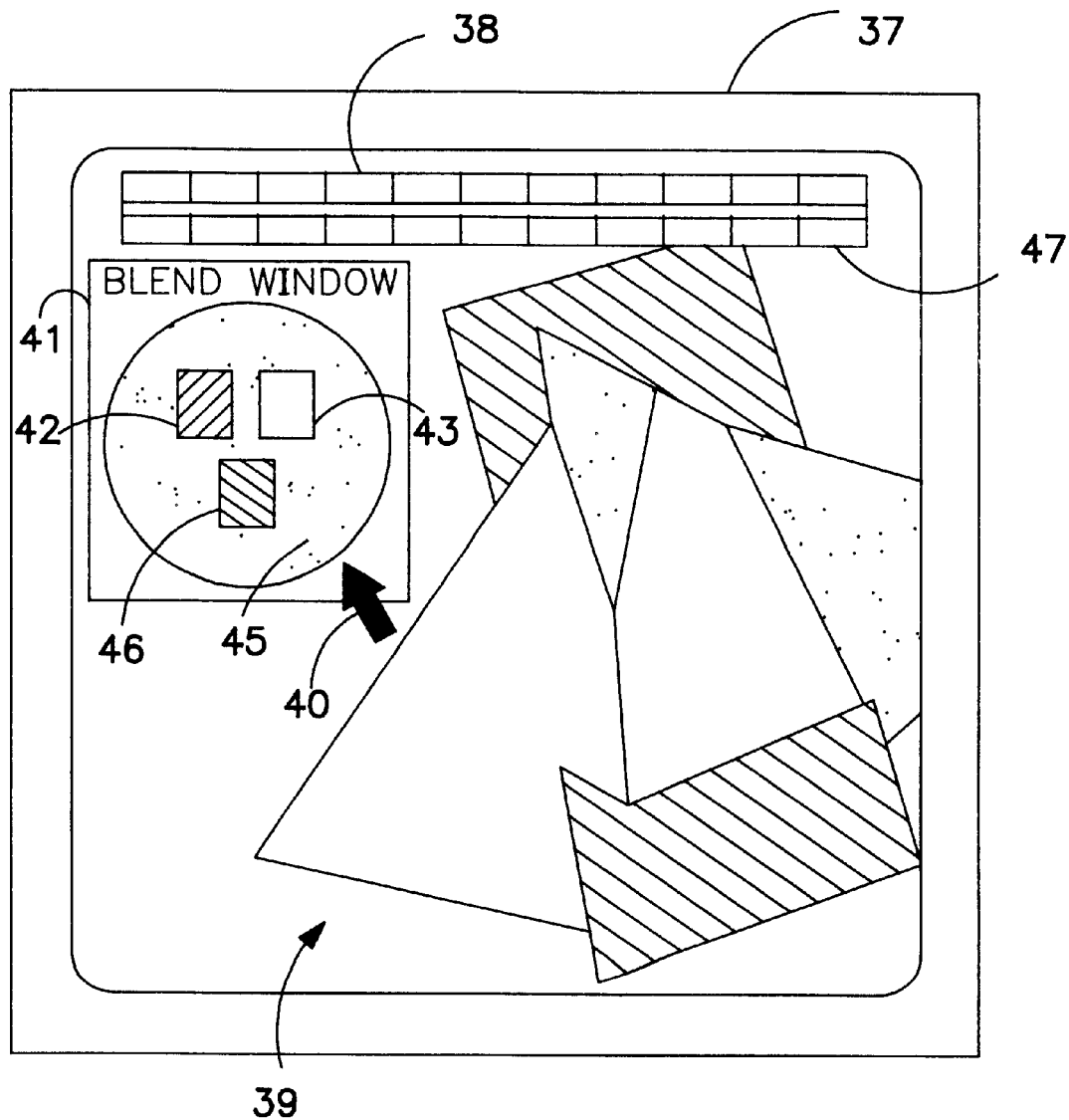
FIG. 7 depicts an alternative blend color selection operation for the system of FIG. 4.

In a farther embodiment of the present invention an editing display screen is described with reference to FIG. 7. The pre-selection of the two colors in the boxes 42 and 43 is the same as described above. A third box 46 is provided for a third color pre-selection from the image 39 and/or the color bar 47 through the use of the mouse pointer 40. Thus the third box 46 indicates the position ($x_3$, y3, $z_3$) as seen in FIG. 1. The pre-selection of the three colors in boxes 42, 43 and 46 enables the CPU 33 to commence solving tree (linear) equations in tree unknowns. This is performed by the CPU 33 implementing a number of calculations consistent with Equation 1 utilizing programs stored in ROM 31 and temporary storage of the RAM 32.

By thus defining ($x_3$, $y_3$, $z_3$), the three simultaneous equations can then be solved, and the constants A, B and C obtained for each of the color components R, G. B and T, which can then be output to the surface equation driving means 34. The surface equation driving means 34 reorganizes that data which is output in parallel and simultaneously to the blend processors 9–12 within the blend calculator 3. The blend calculator 3 can then determine the blended color which is output via the video driver 36 for real-time display to fill the remainder of the inner circle 45 of the blend window 41. Once the desired color is obtained, the window pointer 40 can then be clicked upon the color 45 inside the concentric circles which can then be clicked upon the appropriate portion of the image 39 to effect a color change thereof. Typically, the rotation axis can be chosen at a variety of locations through the x–y plane and parallel to the z-axis.

It will be appreciated that the above described method of selecting ($x_3$, $y_3$, $z_3$) permits refined display, and therefore convenient selection, of blended colors. Those skilled in the art will however appreciate that a simple selection, equivalent to selecting the colors in the boxes 42 and 43, of any third point in the blending plane can be sufficient to provide the required solution to the three simultaneous equations.

It follows from the above that more complex surfaces than planes can be utilized with the present invention, with a corresponding increase in the number of coefficients and an increase in the complexity of blend calculator 3. For example, quadratic surfaces including ellipsoids, spheres or hyperboloids can be represented by an equation of the second order as follows:

$$Ax^2+By^2+Cz^2+Dxy+Exz+Fyz+Gx+Hy+Jz+K=0 \quad \text{Equation 2}$$

where A–K are constants, x and y are positional locations and z is the intensity. Equation 2 can be solved for each color component by obtaining an arbitrary 10 non coincidental points of intensity and positional values for each color component and solving a system of equations 2 to derive the constants A to K. Equation 2 can then be rearranged in terms of z, taking only the positive roots of z. A corresponding, but more complex form of the blend calculator 3 can then be constructed in terms of the rearranged form of z having inputs for the coefficients A–K and the position coordinates x and y.

Figure 8:
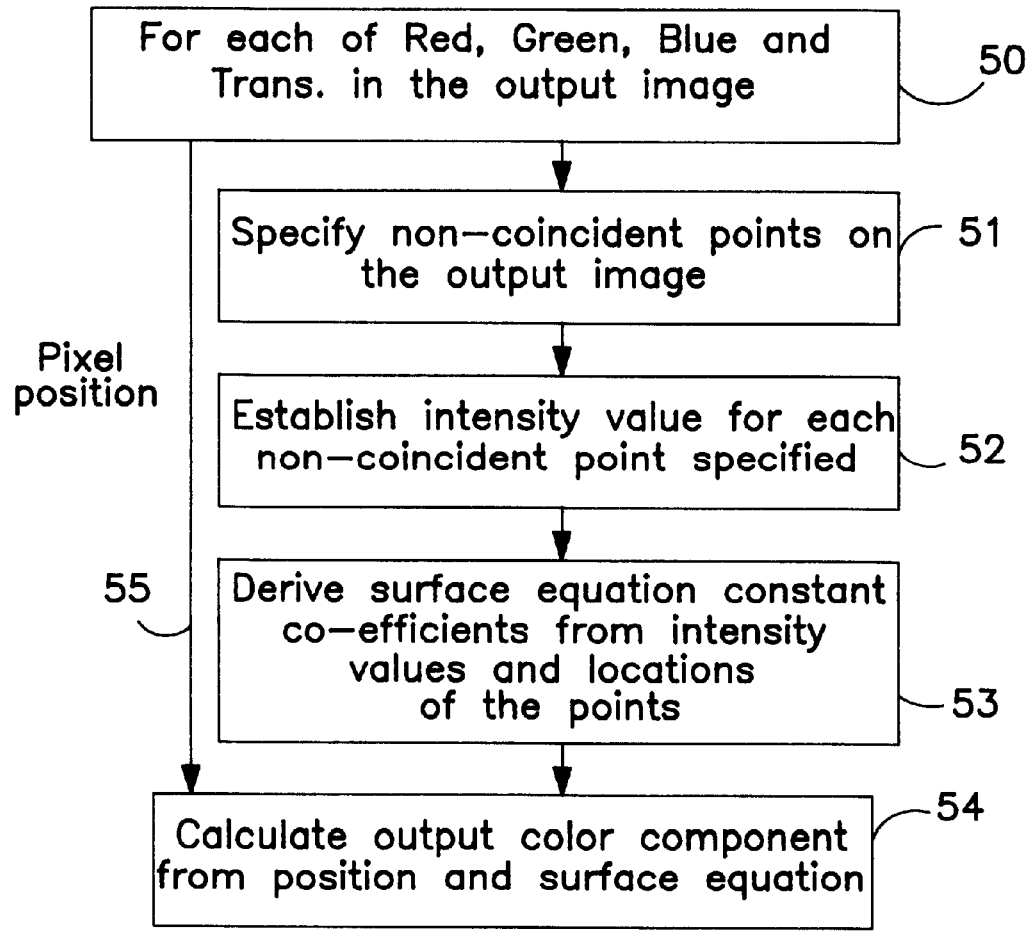
FIG. 8 is a flowchart depicting a simple embodiment.

With reference to FIG. 8, a number of simple steps of the described embodiments can be distilled. At step 50, it is noted that each step applies for each color component. Next, at step 51, the non-coincident points are specified. As indicated above, this can be performed manually for all selected points, or semi-automatically, Next, at step 52, the intensity value for each selected point is established. At step 53, the surface equation is derived for each color component on the basis of the intensity of the non-coincident points. Finally, at step 54, the output color data is derived for each color component on the basis of both the present surface equation and the position 55 of the output image obtained from the information available at step 50.

The described color blend system relates primarily to color blends for computer graphic images utilizing a simplified format and accordingly simplifies the apparatus required to achieve such blends. The simplified format is described as an image color intensity mapped to the coordinate positions (x, y) by a 3-dimensional plane of Intensity against coordinate position for each color component. In general a flat intensity plane can be described by the three coefficients A, B and C for all the position coordinates which describe the plane. As a consequence, the intensity of each color component can be readily calculated from each (x, y) position coordinate as required without the need to store individual pixel values of a blend.

The foregoing describes only a number of embodiments of the present invention, modifications obvious to those skilled in the art can be made thereto without departing from the scope of the invention.

I claim:

1. A method of calculating a color blend for an output image comprising a series of pixels, said method comprising, for each color component of said output image, the steps of:

determining a surface equation defined by a first predetermined number of constant coefficients derived from a set of desired intensity values at a second predetermined number of non-coincident points of said output image; and for each desired output point of said output image, utilizing said surface equation and said constant coefficients to derive an output intensity value of a color component without intermediate storage of individual pixel values constituting said blend.

2. A method of calculating a color blend as claimed in claim 1, wherein said surface equation is a plane of the form:

$$\text{output intensity value}=Ax+By+C$$

where A, B and C are constant coefficients derived from said set of said desired intensity values.

3. A method of calculating a color blend as claimed in claim 1, wherein said set of desired intensity values is three in number.

4. A method of calculating a color blend as claimed in claim 1, wherein said color blend includes a transparency blend.

5. A method of calculating a color blend for an output image, said method comprising the steps of:

specifying a plurality of non-coincident points on a surface to be subject to color blending;

deriving a surface equation for each color component of said output image from a pixel value of each of said points;

directly determining a position of said pixel in a corresponding line; and determining each output color component from the corresponding surface equation and said position of said pixel in the output image to calculate said color blend without intermediate storage of individual pixel values constituting said color blend.

6. A method as claimed in claim 5 wherein at least one of said non-coincident points is manually specified by user selection from an input image.

7. A method as claimed in claim 6 wherein at least two of said non-coincident points are directly manually specified by user selection from said input image and at least one other of said non-coincident points is semi-automatically selected through association with said two non-coincident points.

8. A method as claimed in claim 7 wherein said semi-automatic selection comprises defining a locus of other selectable non-coincident points defined by said two non-coincident points and permitting user selection of at least one point from said locus.

9. A method as claimed in claim 8 wherein colors associated with said two non-coincident points are displayed simultaneously together with a relative position of said one point on said locus and a further color representing a blend of said colors.

10. A method as claimed in claim 9 wherein said further color is updated in real-time as said one point is moved about said locus.

11. A method as claimed in claim 6, wherein at least one of said non-coincident points is selected from a predefined selection of colors.

12. A method of calculating a color blend for an output image, said method comprising the steps of:

specifying a plurality of non-coincident points on a surface to be subject to color blending, wherein at least one of said non-coincident points is manually specified by user selection from an input image, and at least two of said non-coincident points are directly manually specified by user selection from said input image and at least one other of said non-coincident points is semi-automatically selected through association with said two coincident points;

deriving a surface equation for each color component from a pixel value of each of said points;

directly determining a position of said pixel in a corresponding line; and determining each output color component from the corresponding surface equation and said position of said pixel in the output image to calculate said color blend without intermediate storage of individual pixel values constituting said color blend.

13. A method as claimed in claim 12 wherein said semi-automatic selection comprises defining a locus of other selectable non-coincident points defined by said two non-coincident points and permitting user selection of at least one point from said locus.

14. A method as claimed in claim 13 wherein colors associated with said two non-coincident points are displayed simultaneously together with a relative position of said one point on said locus and a further color representing a blend of said colors.

15. A method as claimed in claim 14 wherein said further color is updated in real-time as said one point is moved about said locus.

* * * * *

UNITED STATES PATENT AND TRADEMARK OFFICE
CERTIFICATE OF CORRECTION

PATENT NO. : 5,951,713

DATED : September 14, 1999

INVENTOR(S) : VINCENZO LIGUORI

It is certified that error appears in the above-identified patent and that said Letters Patent is hereby corrected as shown below:

<u>ON TITLE PAGE</u>

[73] Assignees: "Austria" should read --Australia--.

[56] References Cited:
"B8022691" should read --AU B8-022691--.

<u>Column 4</u> line 46, "calculation" should read -calculation of--;

<u>Column 5</u> line 7, "216, however" should read --216; however,--;
line 10, "32" should read --32,--;
line 25, "Y3" should read --$Y_3$--;
line 27, "tree" should read --three--; and
line 51, "will however" should read --will, however,--.

UNITED STATES PATENT AND TRADEMARK OFFICE
CERTIFICATE OF CORRECTION

PATENT NO. : 5,951,713

DATED : September 14, 1999

INVENTOR(S) : VINCENZO LIGUORI

It is certified that error appears in the above-identified patent and that said Letters Patent is hereby corrected as shown below:

COLUMN 6 line 26, "Intensity" should read --intensity--; and
line 35, "invention, modifications" should read
         --invention. Modifications--.

Signed and Sealed this

Thirteenth Day of March, 2001

*Attest:*

NICHOLAS P. GODICI

*Attesting Officer*      Acting Director of the United States Patent and Trademark Office